(12) United States Patent  (10) Patent No.: US 9,395,761 B2
Yukawa et al.  (45) Date of Patent: Jul. 19, 2016

(54) INFORMATION PROCESSING APPARATUS

(71) Applicant: SONY CORPORATION, Tokyo (JP)

(72) Inventors: Shuhei Yukawa, Nagano (JP);
Masayoshi Koganei, Nagano (JP);
Yuuki Kubota, Tokyo (JP)

(73) Assignee: Sony Corporation, Tokyo (JP)

( * ) Notice: Subject to any disclaimer, the term of this patent is extended or adjusted under 35 U.S.C. 154(b) by 68 days.

(21) Appl. No.: 14/339,885

(22) Filed: Jul. 24, 2014

(65) Prior Publication Data

US 2015/0036290 A1    Feb. 5, 2015

(30) Foreign Application Priority Data

Jul. 31, 2013  (JP) .................................. 2013-159961

(51) Int. Cl.
*G06F 1/16* (2006.01)

(52) U.S. Cl.
CPC ............ *G06F 1/1679* (2013.01); *G06F 1/1637* (2013.01); *G06F 1/1675* (2013.01); *G06F 1/1681* (2013.01)

(58) Field of Classification Search
CPC ...... G06F 1/166; G06F 1/1675; G06F 1/1681
USPC .................................................... 361/679.59
See application file for complete search history.

(56) References Cited

U.S. PATENT DOCUMENTS

| 7,034,755 | B2 * | 4/2006 | Takagi | ............... | H04M 1/0216 |
| | | | | | 343/702 |
| 7,111,773 | B1 * | 9/2006 | So | ......................... | G06F 1/1626 |
| | | | | | 235/1 D |
| 8,922,995 | B2 * | 12/2014 | Su | ......................... | F16M 11/10 |
| | | | | | 248/917 |
| 2005/0037821 | A1 * | 2/2005 | Takagi | ............... | H04M 1/0216 |
| | | | | | 455/575.3 |
| 2009/0126154 | A1 * | 5/2009 | Lin | ........................ | G06F 1/1616 |
| | | | | | 16/286 |
| 2010/0149733 | A1 * | 6/2010 | Luke | ..................... | G06F 1/1616 |
| | | | | | 361/679.01 |
| 2012/0272481 | A1 * | 11/2012 | Ahn | ..................... | H04M 1/0216 |
| | | | | | 16/325 |
| 2013/0160243 | A1 * | 6/2013 | Kakizaki | ............. | H04M 1/0216 |
| | | | | | 16/341 |
| 2014/0224953 | A1 * | 8/2014 | Quijano | ............... | F16M 11/046 |
| | | | | | 248/398 |

* cited by examiner

*Primary Examiner* — Anthony Q Edwards
(74) *Attorney, Agent, or Firm* — Paratus Law Group, PLLC

(57) ABSTRACT

There is provided an information processing apparatus including a first member and a second member which are connected by rotation mechanisms. The rotation mechanisms each have a compression spring which expands and contracts along an axial direction of a rotation shaft serving as a center of a rotation, a cam which is rotated by the compression member and generate torque which rotates the first member and the second member, and a damper which generates a load to the torque generated by the cam according to a rotation speed of the rotation shaft. A pressure angle of the cam is set in such a manner that a ratio in which a return force of the compression spring is converted to force which rotates the cam as the compression spring is further compressed is reduced.

10 Claims, 12 Drawing Sheets

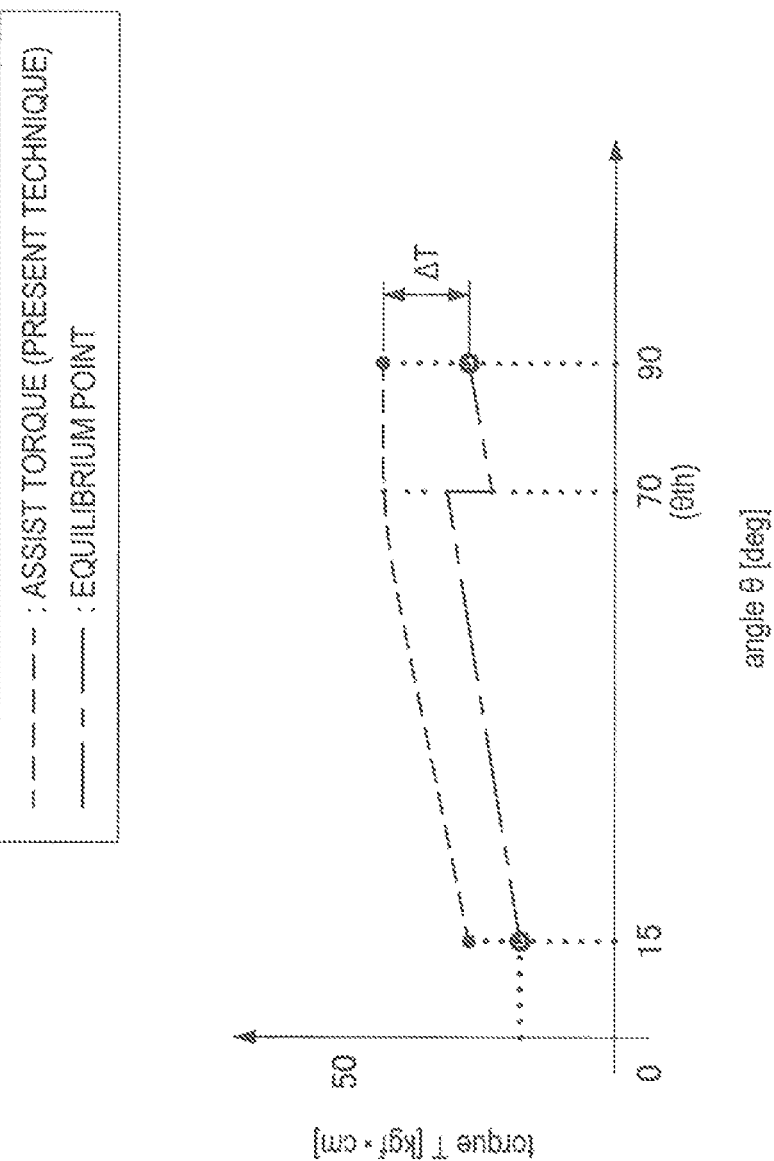

INFORMATION PROCESSING APPARATUS

CROSS REFERENCE TO RELATED APPLICATIONS

This application claims the benefit of Japanese Priority Patent Application JP 2013-159961 filed Jul. 31, 2013, the entire contents of which are incorporated herein by reference.

BACKGROUND

The present disclosure relates to an information processing apparatus having rotation mechanisms which rotatably connect two members.

In recent years, an integral-type information terminal has been increasingly expected as an information processing apparatus which can be simultaneously used by a plurality of users while surrounding the main body thereof, i.e., an information processing apparatus which can be used like a so-called large screen tablet. When using the same by a plurality of users, the users use the same with a posture in which the users look into the screen from both sides across the integral-type information terminal. It has been demanded to be able to easily change the style between such a lay flat style with a plurality of users and a former desktop style simply by the operation of the main body angle by a user.

In the integral-type information terminal, a system in which a substrate which is referred to as a board PC, a device, and a display portion, such as an LCD (Liquid Crystal Display), are integrated is laid out in a solid-plate chassis structure. In the integral-type information terminal, a style referred to as a photo frame type in which a stand stay on the back surface of the main body for preventing fall secures a balance has been frequently adopted in recent years. The photo frame type information terminal has a simple stand structure but allows free angle adjustment (for example, JP 2007-281345A and the like).

SUMMARY

The angle adjustment function of the photo frame type information terminal generally balances the reaction force of torque generated using a torsion spring and a belleville spring in the turning central portion of a hinge portion and the frictional force to thereby stop the main body at a desired angle. In the torsion spring, when the tilt angle of the main body becomes deeper, the reaction force becomes stronger due to the properties of the spring. The belleville spring generates a fixed friction irrespective of the posture of the main body to the stand. The total friction of the hinge portion is determined based on the total force of such a torsion spring and such a belleville spring.

The friction for the hinge portion is calculated by the sum of the total friction of the hinge portion and the operation force of a user. By setting the friction of the hinge portion to be close to the static friction, the operation force of the user when the main body stops and when the angle of the main body is adjusted can be suitably set. However, in the torsion spring, the changeable range tends to be small and the spring constant tends to be also large. Therefore, the torsion spring is not suitable for application to the integral-type information terminal whose angle changes in a wide angle range from the desktop style to the lay flat style. Then, a rotation mechanism which can adjust the usage style in a wide angle range has been demanded.

According to the present disclosure, there is provided an information processing apparatus including a first member and a second member which are connected by rotation mechanisms. The rotation mechanisms each have a compression spring which expands and contracts along an axial direction of a rotation shaft serving as a center of a rotation, a cam which is rotated by the compression member and generate torque which rotates the first member and the second member, and a damper which generates a load to the torque generated by the cam according to a rotation speed of the rotation shaft. A pressure angle of the cam is set in such a manner that a ratio in which a return force of the compression spring is converted to force which rotates the cam as the compression spring is further compressed is reduced.

According to the present disclosure, the rotation mechanisms which connect the two members of the information processing apparatus is constituted by a compression spring, a cam which generates torque using the return force of the compression spring from the natural length, and an oil damper which generates a load which reduces the torque generated by the cm. By the use of the compression spring, it can be easily adjusted in such a manner that even when the spring constant is made small, a high return force can be generated. Therefore, also when it is configured so that the two members are rotatable in a wide angle range, the rotation mechanisms can generate a stable torque, so that the adjustment of the usage style in a wide angle range can be achieved. Moreover, by setting the pressure angle of the cam in such a manner that a ratio in which the return force of the compression spring is converted to the force which rotates the cam as the compression spring is further compressed decreases, the generation of the reaction force of the compression spring generated when the two members of the information processing apparatus are almost horizontal.

As described above, according to the present disclosure, an information processing apparatus having rotation mechanisms capable of adjusting the usage style in a wide angle range can be realized.

BRIEF DESCRIPTION OF THE DRAWINGS

FIG. 12 is a graph showing relationship between the tilt angle of the main body to the perpendicular direction and torque generated by the rotation mechanisms according to the embodiment.

DETAILED DESCRIPTION OF THE EMBODIMENTS

Figure 1:
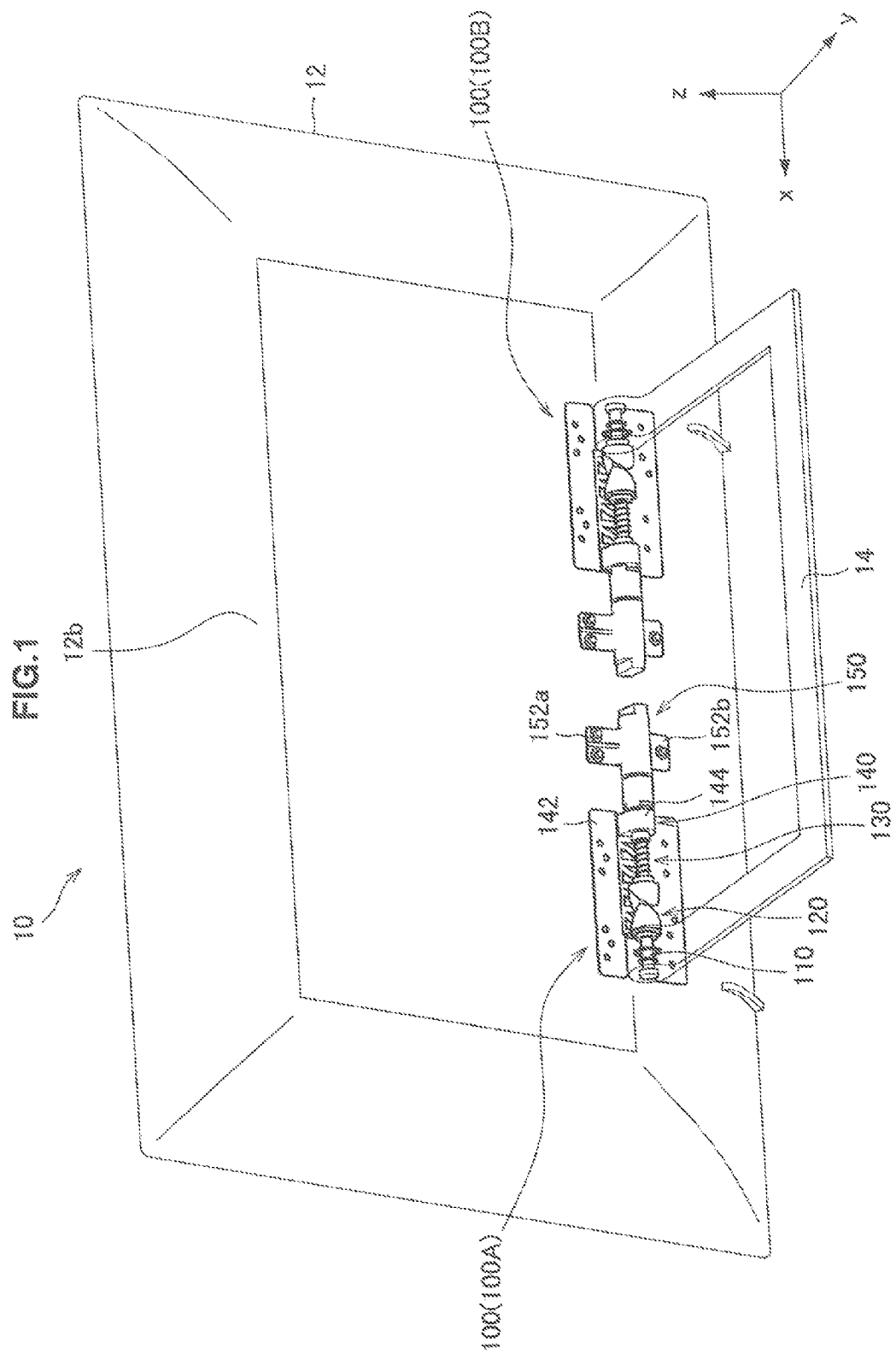
FIG. 1 is a perspective view schematically illustrating the configuration of an information terminal according to a first embodiment of the present disclosure and illustrates a state as viewed from the back side of a main body 12.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is given in the following order.
1. First Embodiment (Information Terminal having rotation mechanisms having a wide angle adjustment function)
   1.1. Schematic structure of information terminal
   1.2. Rotation mechanism
      1.2.1. Design concept
      1.2.2. Configuration
      1.2.3. Operation
   1.3. Conclusion
2. Second Embodiment (Information Terminal in which generation of spring back phenomenon is avoided)
   2.1. Change of supporting point of information terminal
   2.2. Adjustment of pressure angle of cam
   2.3. Relationship between tilt angle of main body and torque generated by rotation mechanisms
   2.4. Conclusion <1. First Embodiment>
[1.1. Schematic Structure of Information Terminal]

Figure 2:
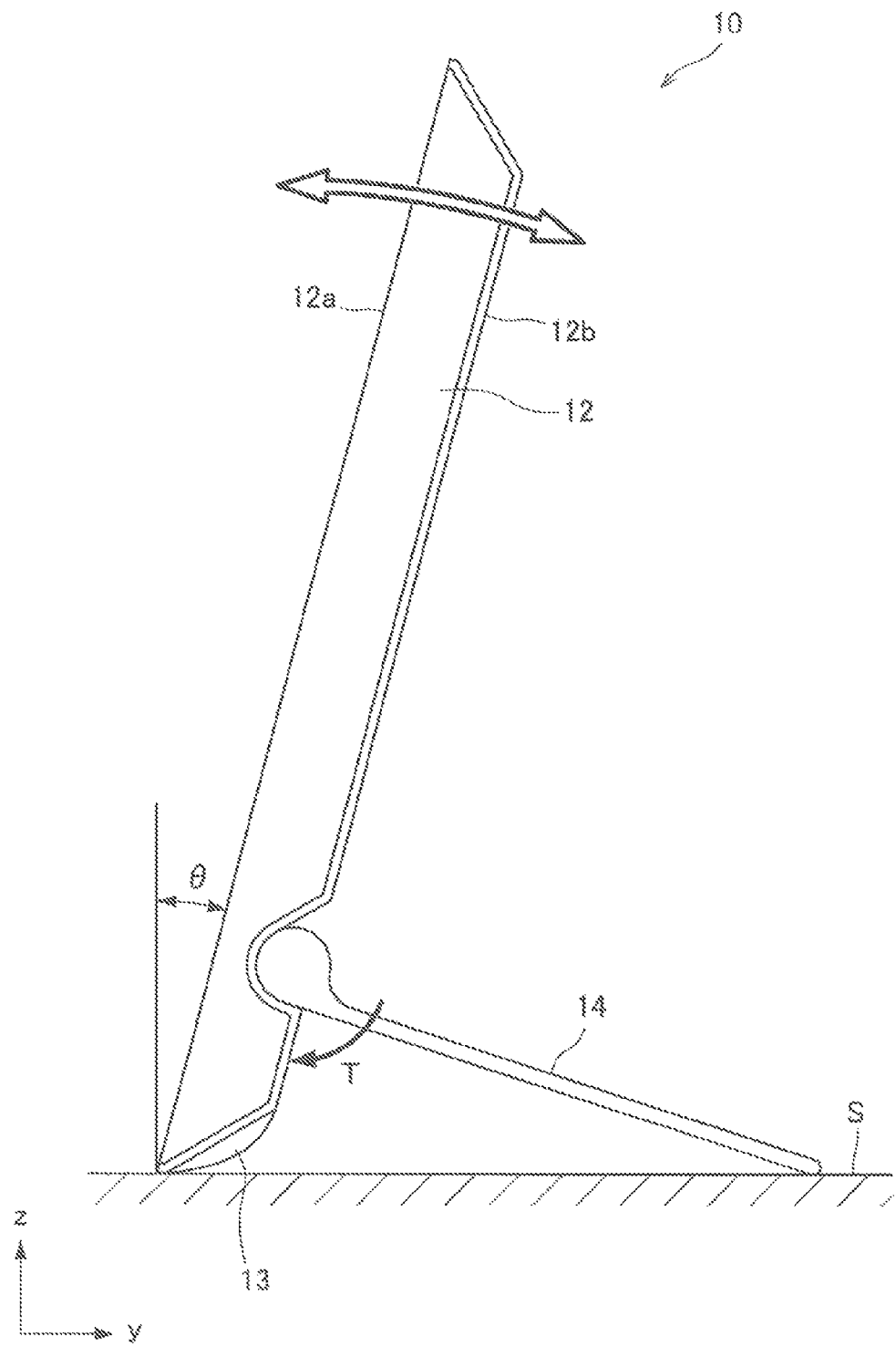
FIG. 2 is a side view illustrating a state when the information terminal according to the embodiment is set into a desktop style.
Figure 3:
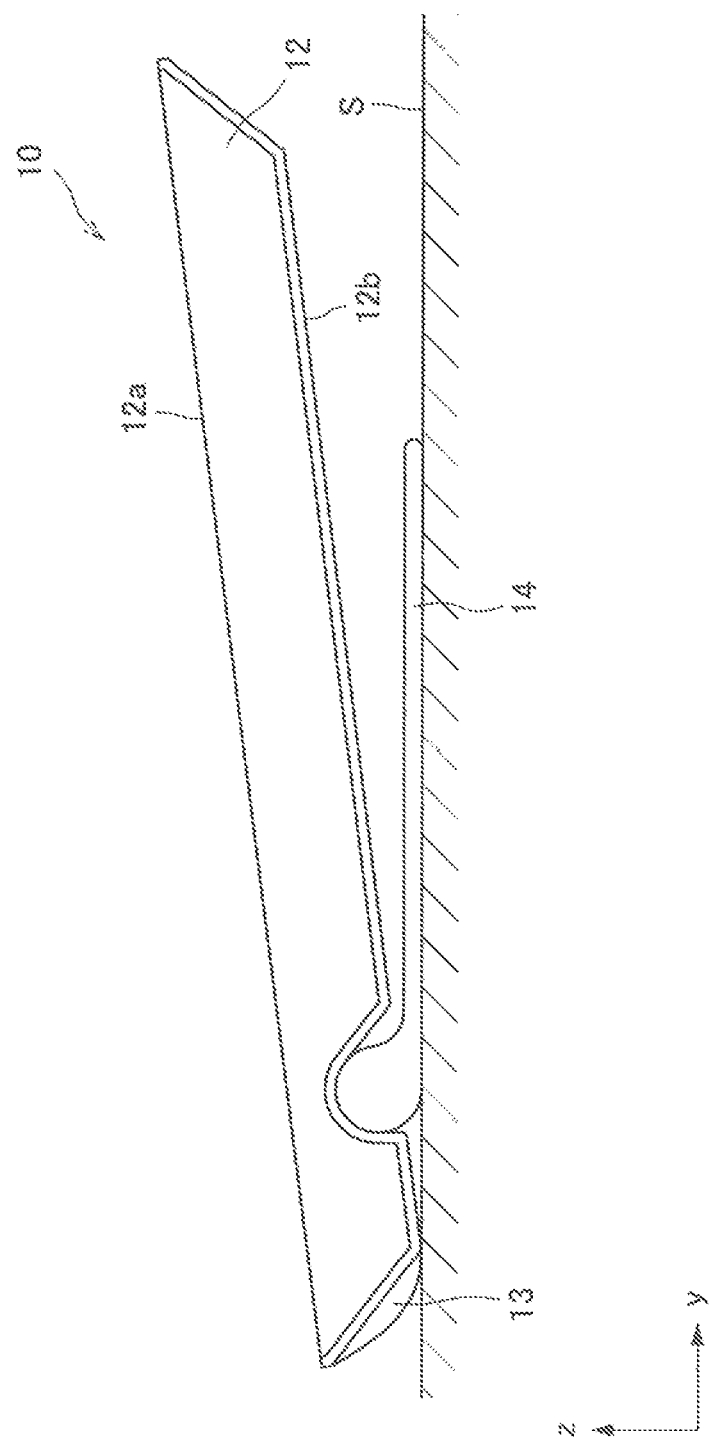
FIG. 3 is a side view illustrating a state when the information terminal according to the embodiment is set to a lay flat style.

First, the schematic structure of an information terminal according to a first embodiment of the present disclosure is described with reference to FIG. 1 to FIG. 3. FIG. 1 is a perspective view illustrating the schematic structure of an information terminal 10 according to this embodiment and illustrates a state as viewed from the back side of a main body 12. FIG. 2 is a side view illustrating a state when the information terminal 10 according to this embodiment is set into a desktop style. FIG. 3 is a side view illustrating a state when the information terminal 10 according to this embodiment is set to a lay flat style. In the following description, the direction which serves as the perpendicular direction when the information terminal 10 is placed on a mount surface S is defined as the height direction (z direction). The direction which is parallel to the mount surface S and is orthogonal to the depth direction (y direction) of the main body 12 is defined as the width direction (x direction).

The information terminal 10 according to this embodiment contains the main body 12 and a stand 14 provided on a back surface 12a of the main body 12 as illustrated in FIG. 1 to FIG. 3. The main body 12 has a display portion (not illustrated) which displays information on a front surface 12a and has a substrate, a device, and the like therein. The stand 14 is a member which supports the main body 12 to hold a posture in which the front surface 12a has a predetermined tilt angle θ to the perpendicular direction when the main body 12 is placed on the mount surface S. The two members of the main body 12 and the stand 14 are connected by two rotation mechanisms 100A and 1003.

The rotation mechanisms 100A and 10013 are mechanisms which allow the rotation of the stand 14 to the main body 12. By providing the rotation mechanisms 100A and 100B, the main body 12 can be easily changed to arbitrary postures and held in the posture. The rotation mechanisms 100A and 100B are provided side by side in the width direction of the main body 12 and are fixed to a back surface 12b of the main body 12 with fixing members 142 and 152 (152a and 152b).

The rotation mechanisms 100A and 100B have the same configuration and are provided in such a manner as to be symmetrical with respect to the width direction center of the main body 12. The rotation mechanisms 100A and 100B each have a rotation shaft 110, cams 120, a compression spring 130, a fixing member 140, and an oil damper 150. A detailed configuration of the rotation mechanisms 100A and 100B and the action thereof are described later.

The information terminal 10 can be used in a desktop style in which the main body 12 is stood on the mount surface S as illustrated in FIG. 2 or can be used in a lay flat style in which the main body 12 is laid down on the mount surface S as illustrated in FIG. 3. The tilt angle θ of the main body 12 in the desktop style is about 15° and the tilt angle θ of the main body 12 in the lay flat style is about 90°. Thus, the information terminal 10 according to this embodiment can tilt the main body 12 in a wide angle range using a bottom support portion 13 provided on a portion contacting the mount surface S of the main body 12 as the supporting point.

A user can set the information terminal 10 into the lay flat style of FIG. 3 by pressing the upper portion of the front surface 12a of the information terminal 10 in the state of the desktop style of FIG. 2 to the back side to tilt the same, for example. Or, a user can set the information terminal 10 into the desktop style of FIG. 2 by pulling up the upper portion of the front surface 12a to the front while pressing down the stand 14 of the information terminal 10 in the state of the lay flat style of FIG. 3 to the mount surface S, for example. When pressing the upper portion of the main body 12 to the back side to tilt the same or when pulling up the upper portion of the main body 12 to the front to raise the same, the rotation mechanisms 100A and 100B can be moved in a synchronized manner in each operation.

[1.2. Rotation Mechanism]
(1.2.1. Design Concept)

The information terminal 10 according to this embodiment can change the tilt of the main body 12 in a wide angle range to the perpendicular direction according to the usage style and can hold the posture. The posture of the main body 12 can be held by balancing the reaction force of the torque generated by the rotation mechanisms 100 and the frictional force. As a former rotation mechanism, a hinge constituted using a torsion spring and a belleville spring is generally used. However, as described above, due to such properties of the torsion spring that the transformable range is small and the spring constant is high, it is difficult to appropriately set the operation force of a user when rotating the main body 12.

Figure 4:
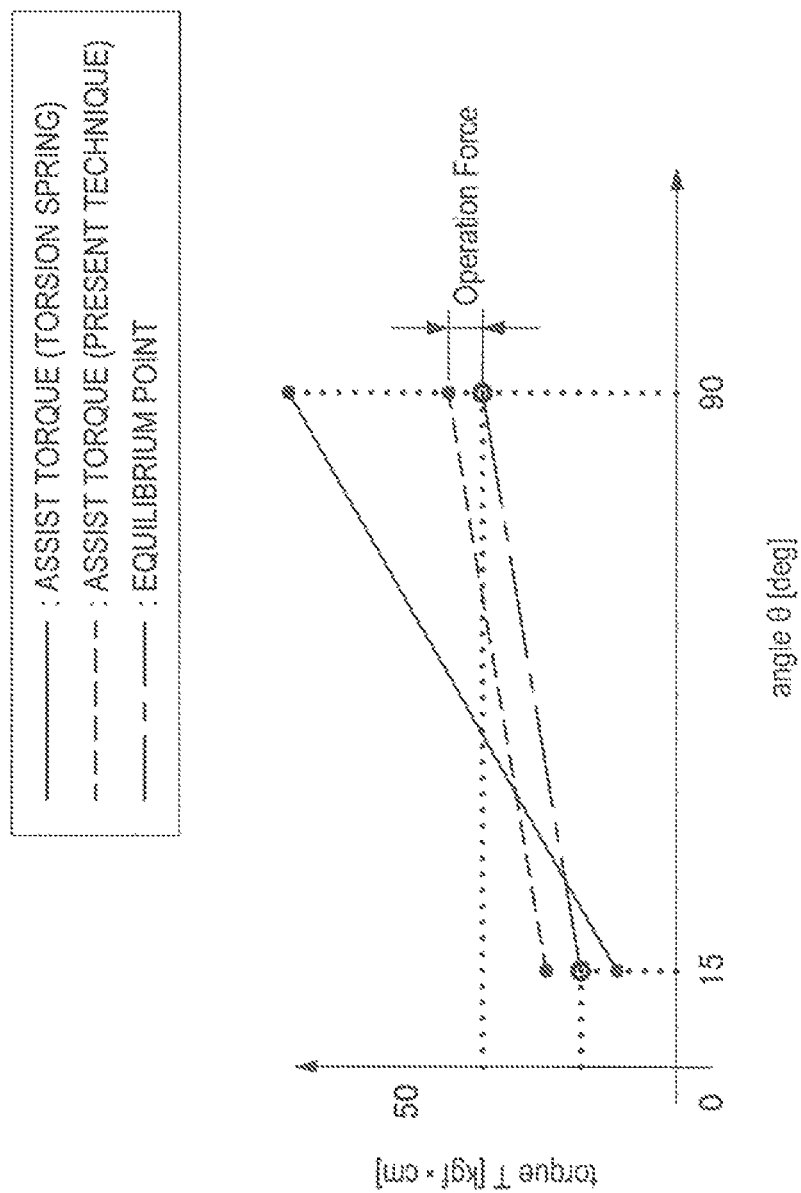
FIG. 4 is a graph showing the relationship between the tilt angle of the main body to the perpendicular direction and torque generated by the rotation mechanisms according to the embodiment.

FIG. 4 shows the relationship between the till angle θ of the main body 12 to the perpendicular direction and a torque T generated by the rotation mechanisms. FIG. 4 shows the changes of the torque T with the changes of the till angle 9 of the main body in the case where the rotation mechanisms 100 according to this embodiment are used and in the case where a former hinge constituted using a torsion spring and a belleville spring is used. The dashed lines of FIG. 4 show the relationship between the tilt angle 9 of the main body 12 and the torque T at the equilibrium point where the balance with the frictional force is achieved and the posture of the main body 12 is held.

In order to change the tilt angle θ of the main body 12 of the information terminal 10 whose posture is held in a certain posture by a user, there is a necessity of applying a force higher than the torque T at the equilibrium point in the tilt angle θ to the main body 12. In order to assist the operation force for moving the main body 12, the compression spring 130 is provided in each of the rotation mechanisms 100 according to this embodiment and the former hinge is provided with a torsion spring. The compression spring 130 and the torsion spring become closer to the natural length when the tilt angle θ of the main body 12 becomes smaller and are further compressed when the tilt angle θ of the main body 12 becomes larger.

At this time, since the torsion spring has a high spring constant, the torque T considerably changes according to the size of the tilt angle θ of the main body 12 as illustrated by the solid line of FIG. 4. When the tilt angle θ of the main body 12 is as small as around 15°, the torque T generated by the torsion spring becomes very small and becomes smaller than the torque at the equilibrium point. Therefore, the self-standing of the main body 12 becomes unstable. On the other hand, when the tilt angle θ of the main body 12 becomes larger than about 70°, the torque T generated by the torsion spring becomes larger to be larger than the torque at the equilibrium point. As a result, a user adjusts the tilt angle θ of the main body 12 with a high operation force in such a manner that the posture of the main body 12 is not rapidly changed by the high torques T.

Thus, in the hinge employing the torsion spring, the range of the tilt angle θ of the main body 12 at which the posture of the information terminal 10 can be stably held is small. Then, in the rotation mechanisms 100 according to this embodiment, the torque T which changes similarly to the change of the torque at the equilibrium point with the change of the tilt angle θ of the main body 12 is generated as shown by the dashed line of FIG. 4. Thus, even when the tilt angle θ of the main body 12 becomes smaller, the posture of the information terminal 10 can be stably held and even when the tilt angle θ of the main body 12 becomes larger, a rapid change of the posture of the information terminal 10 can be avoided.

A difference of the torque serving as the equilibrium point and the torque generated by the rotation mechanisms 100 serves as an operation force demanded when a user moves the main body 12. Therefore, by performing setting to let the rotation mechanisms 100 generate torque; in such a manner as to obtain the operation force which facilitates the operation of a user, the user can comfortably change the posture of the information terminal 10.

(1.2.2. Configuration)

Figure 5:
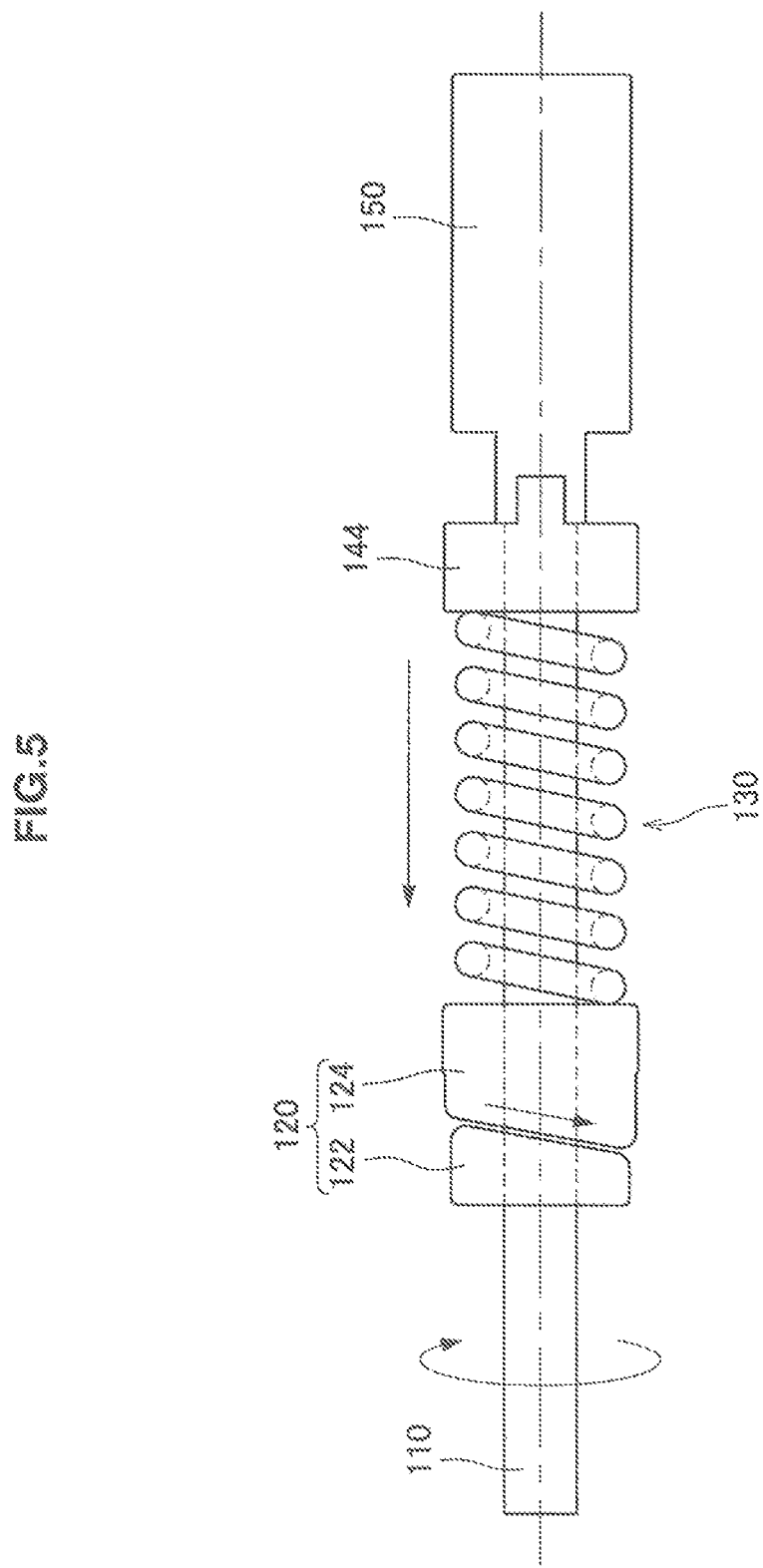
FIG. 5 is a schematic plan view illustrating the configuration of the rotation mechanism according to the embodiment.
Figure 6:
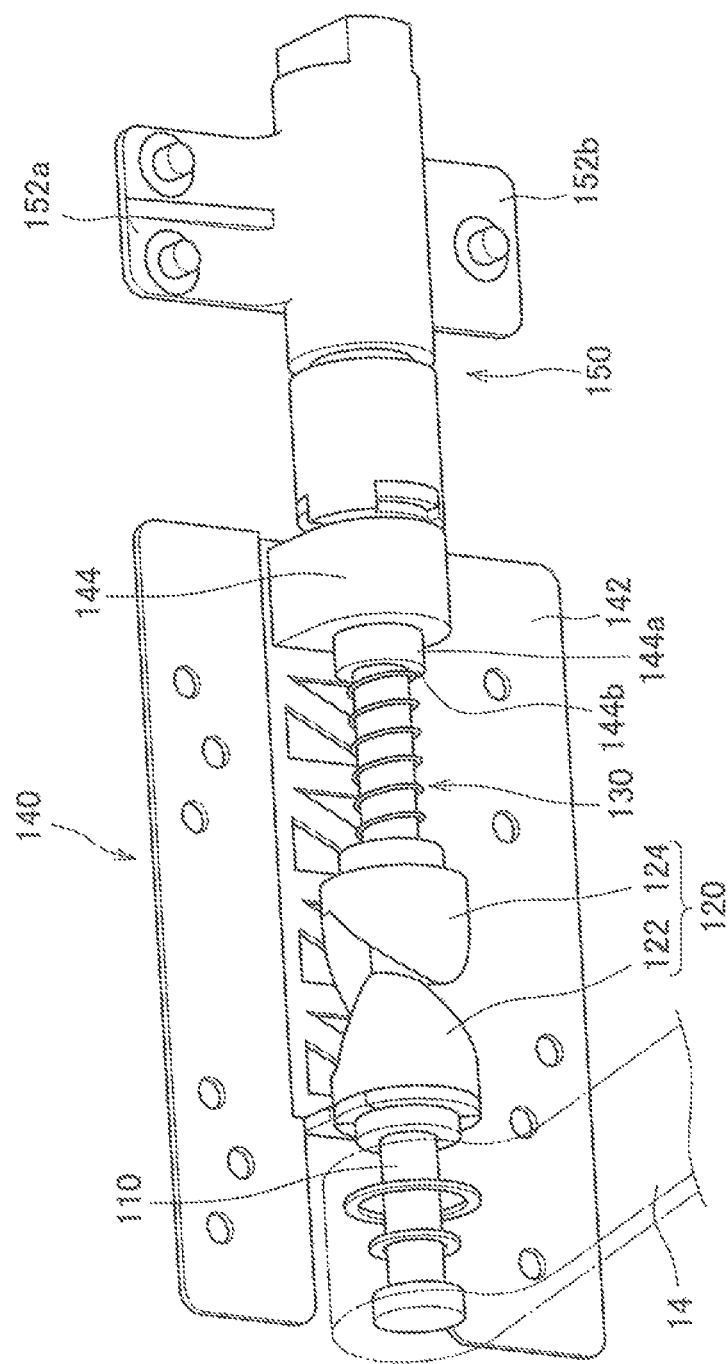
FIG. 6 is a perspective view illustrating the configuration of the rotation mechanism according to the embodiment.
Figure 7:
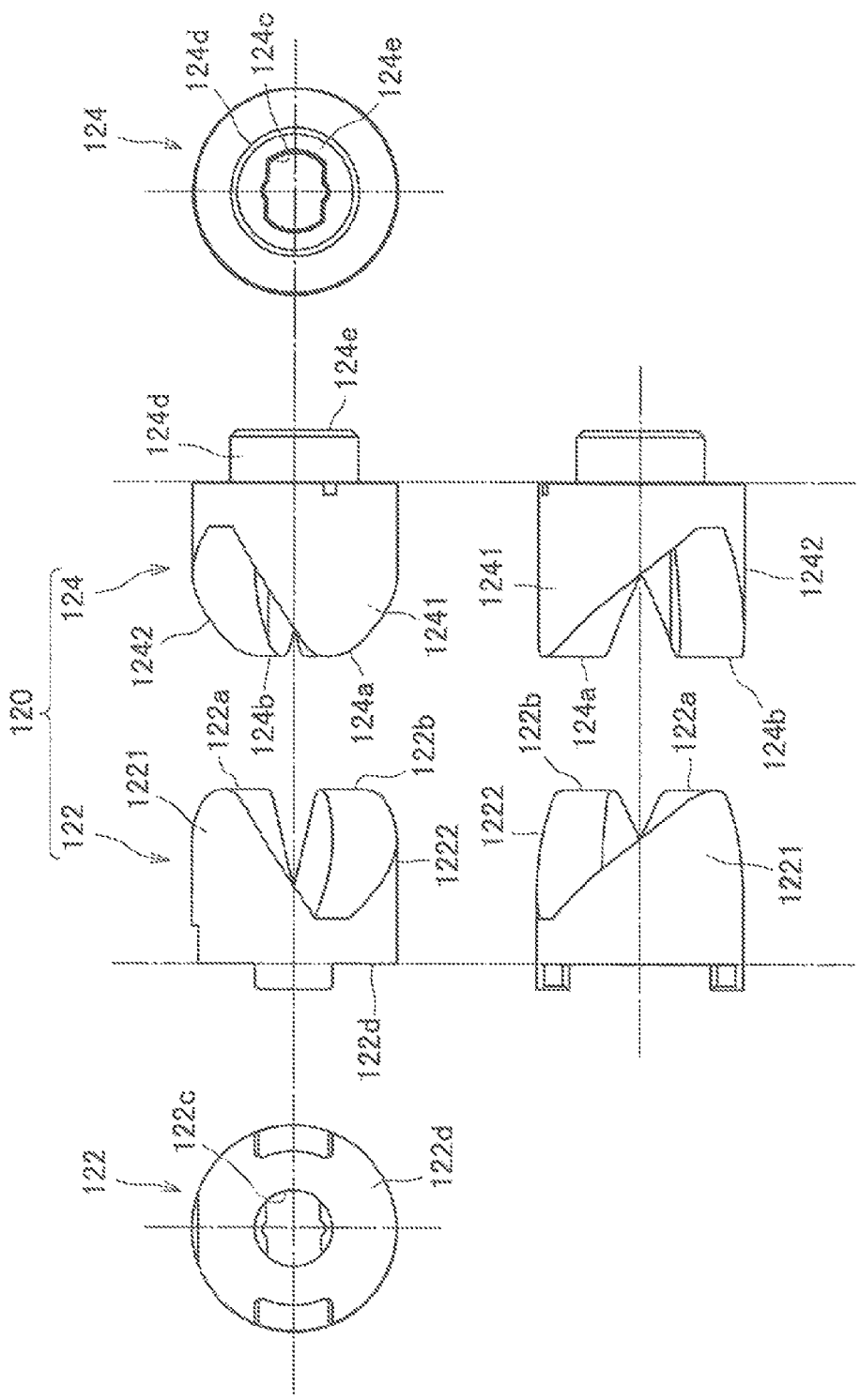
FIG. 7 is an exploded plan view and a side view illustrating the configuration of cams of the rotation mechanisms according to the embodiment.
Figure 8:
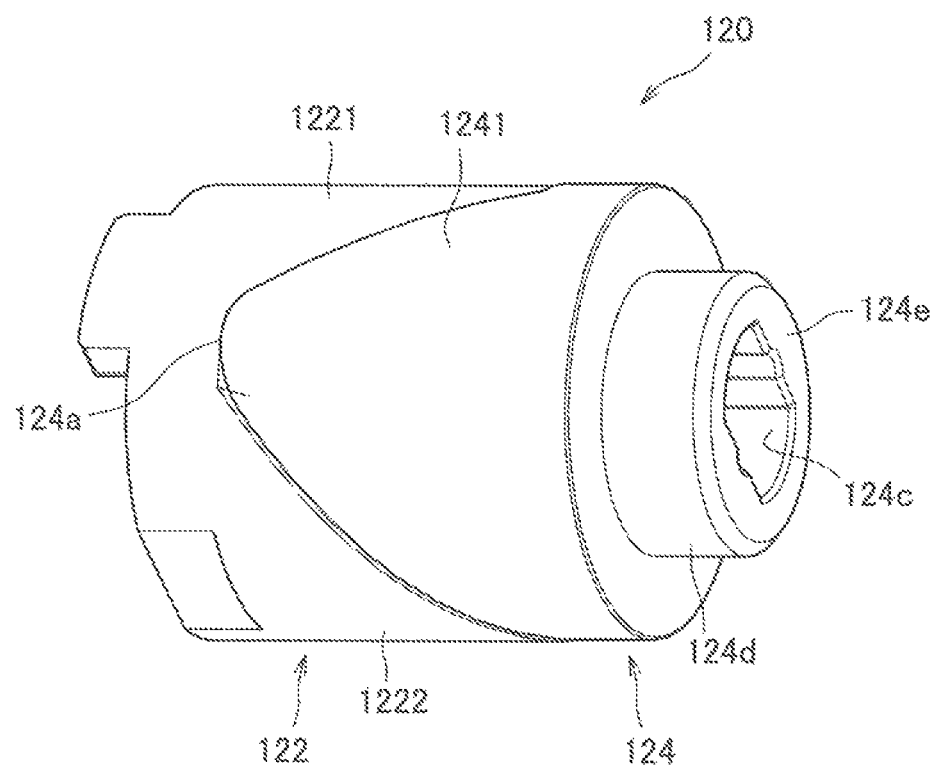
FIG. 8 is a perspective view illustrating the engagement state of the cams according to the embodiment.

With reference to FIG. 5 to FIG. 8, the configuration of the rotation mechanisms 100 according to this embodiment is described in detail, FIG. 5 is a schematic plan view illustrating the configuration of the rotation mechanisms 100 according to this embodiment. FIG. 6 is a perspective view illustrating the configuration of the rotation mechanism 100 according to this embodiment. FIG. 7 is an exploded plan view and a side view illustrating the configuration of the cams 120 of the rotation mechanisms 100 according to this embodiment. FIG. 8 is a perspective view illustrating the engagement state of the cams 120 according to this embodiment.

The rotation mechanisms 100 according to this embodiment each have the rotation shaft 110, the cams 120, the compression spring 130, the fixing member 140, and the oil damper 150 as illustrated in FIG. 5.

The rotation shaft 110 is a shaft serving as the rotation center of the main body 12 and the stand 14 connected by the rotation mechanisms 100. One end of the rotation shaft 110 is fixed to the stand 14 and rotates with the stand 14. The other end of the rotation shaft 110 is fixed to a wing shaft of the oil damper 150.

The cams 120 are elements which are turned by the return force with which the compression spring 130 attempts to expand from a state where the compression spring 130 is further compressed than in the state in the natural length. The cams 120 contain a first cam 122 fixed to the rotation shaft 110 and a second cam 124 which is configured to be able to be engaged with the first cam 122.

The first can 122 is a member of a cylindrical shape in which a through-hole 122c is formed in the center and one end is divided into two branches as illustrated in FIG. 7. One end side of the cylindrical portion divided into two branches has a first extremity portion 1221 and a second extremity portion 1222, which are formed into an almost symmetrical shape with respect to the rotation shaft 110. The first extremity portion 1221 and the second extremity portion 1222 have a shape which curves toward the tip. The rotation shaft 110 is passed through the through-hole 122c, and the passed rotation shaft 110 is fixed to the first cam 122.

The second cam 124 is a member of a cylindrical shape in which a through-hole 124c is formed in the center and one end is divided into two branches similarly to the first cam 122 as illustrated in FIG. 7. One end side of the cylindrical portion divided into two branches has a first extremity portion 1241 and a second extremity portion 1242, which are formed into an almost symmetrical shape with respect to the rotation shaft 110. On the other end side of the cylindrical portion, a projection portion 124d which projects in the axial direction of the rotation shaft 110 is provided. An end surface 124e of the projection portion 124d contacts the compression spring 130. At this time, the other end portion on the side of the second cam 124 of the compression spring 130 may be fixed to the second cam 124. The through-hole 142c is formed in such a manner as to pass through the cylindrical portion and the projection portion 124d and the rotation shaft 110 is passed through the through-hole 142c.

The first cam 122 and the second cam 124 are formed in such a manner that the extremity portions 1221, 1222, 1241, and 1242 thereof are engaged as illustrated in FIG. 8. The second cam 124 is turned by the return force of the compression spring 130. At this time, the second cam 124 moves along the curved surfaces of the tip portions 122a and 122b of the extremity portions 1221 and 1222 of the first cam 122 to be engaged with the first cam 122 or separated from the first cam 122.

The compression spring 130 is an elastic member which generates torque which rotates the rotation mechanism 100. The compression spring 130 is formed by winding a metal wire or the like in a coil shape and attempts to expand to the force applied in the compression direction. The compression spring 130 is passed through the rotation shaft 110 and is provided between the cam 120 and the fixing member 140 in the state where the compression spring 130 is further compressed than in the state in the natural length. At this time, one end of the compression spring 130 may be fixed to the second cam 124 and the other end thereof may be fixed to the fixing member 140. By fixing the end portions of the compression spring 130 to the second cam 124 and the fixing member 140, the contact sound of each element can be prevented from occurring in the operation of the rotation mechanism 100.

The compression spring 130 is used as a low load spring in which the spring constant can be set to be small by setting the natural length to be long. Therefore, the compression spring 130 is suitable for application to a mechanism which generates assist torque in a wide angle adjustment range as in the rotation mechanisms 100 according to this embodiment. Moreover, since the compression spring 130 may be provided in such a manner as to be passed through the rotation shaft 120 to press the cam 120 thereinto, the rotation mechanisms 100 are easily manufactured and the torque control in the manufacturing is simple.

The fixing member 140 is a member for fixing the rotation mechanism 100 to the main body 12 and regulating the movement in the axial direction of the other end of the compression spring 130. The fixing member 140 contains a plate portion 142 and a spring holding portion 144 as illustrated in FIG. 6.

The plate portion 142 is a member which fixes the rotation mechanism 100 to the main body 12. The plate portion 142 is provided across the rotation shaft 110 of the rotation mechanism 100. Thus, the contact surface area of the plate portion 142 and the back surface 12*b* of the main body 12 can be enlarged, so that the rotation mechanism 100 can be surely fixed to the main body 12. Moreover, by enlarging also the length in the axial direction of the rotation shaft 110 of the plate portion 142, the rotation mechanism 100 and the main body 12 can be more stably, fixed. For example, as illustrated in FIG. 6, the plate portion 142 may be provided in an axial direction from one end of the rotation shaft 110 to which the stand 14 is connected to a portion where the cam 120, the compression spring 130, and the spring holding portion 144 are placed.

The spring holding portion 144 is a member of an approximately cylindrical shape which is passed through the rotation shaft 110 and is rotatably provided and one part of the side surface is fixed to the plate portion 142. In the spring holding portion 144, a projection portion 144*a* which projects in the axial direction is formed on a surface which is made to face the other end of the compression spring 130 when the spring holding portion 144 is passed through the rotation shaft 110. The other end portion of the compression spring 130 is provided in such a manner as to contact an end surface 144*b* of the projection portion 144*a*.

The oil damper 150 is a member which absorbs shock utilizing the viscosity of oil. The oil damper 150 provided in the rotation mechanisms 100 of this embodiment prevents the turn when the turning speed of the rotation shaft 110 becomes higher in such a manner that the main body 12 does not rapidly rotate when the torque generated by the rotation mechanisms 100 becomes very high.

As the oil damper 150 according to this embodiment, a rotary system swinging oil damper can be used, for example. The oil damper 150 has a configuration in which a wing shaft connected to the rotation shaft 110 is provided inside a housing into which oil is injected. The housing of the oil damper 150 is fixed to a back surface 12*b* of the main body 12 by damper fixing portions 152*a* and 152*b*. The oil damper 150 generates a braking force by the viscosity resistance of the oil when the wing shaft turns with the turn of the rotation shaft 110.

In the rotation mechanism 100 according to this embodiment, the cam 120, the compression spring 130, and the spring fixing portion 144 are passed through the rotation shaft 110 in the stated order and the oil damper 150 in which the wing shaft is connected to the rotation shaft 110 is provided on the end portion on the side of the spring fixing portion 144. The stand 14 is fixed to the end portion of the rotation shaft 110 on the side where the cam 120 is provided. The stand 14 rotates with the rotation shaft 110.

(1.2.3. Operation)

The rotation mechanism 100 generates torque which turns the cam 120 using the return force of the compression spring 130 provided in the state where the compression spring 130 is further compressed than in the state in the natural length. More specifically, since the compression spring 130 is provided in the compressed state, the compression spring 130 attempts to return to the natural length, so that the compression spring 130 typically presses the contacting members with the both ends. The spring fixing portion 144 which one end of the compression spring 130 contacts is fixed to the rotation shaft 110. On the other hand, the second cam 124 which the other end of the compression spring 130 contacts is movable in the axial direction to the rotation shaft 110. Therefore, the second cam 124 moves by the return force of the compression spring 130.

The second cam 124 is moved to the first cam 122 by being pressed by the compression spring 130. At this time, the curved surfaces of the tip portions 124*a* and 124*b* of the extremity portions 1241 and 1242 move along the curved surfaces of the tip portions 122*a* and 122*b* of the extremity portions 1221 and 1222 of the first cam 122, so that the second cam 124 is engaged with the first cam 122 or separated from the first cam 122.

In the information terminal 10, the rotation mechanism 100 is provided in such a manner that a high torque is generated when the tilt angle θ of the main body 12 becomes larger, so that the usage state of the information terminal 10 is close to the usage state in the lay flat style as illustrated in FIG. 3. More specifically, the compression spring 130 is considerably compressed as the tilt angle θ of the main body 12 becomes larger, so that the return force which rotates the second cam 124 becomes higher. Therefore, when the tilt angle θ of the main body 12 is increased, torque, which acts in the direction where the tilt angle θ of the main body 12 becomes smaller, generated by the cams 120 becomes higher. On the other hand, since the turning speed of the rotation shall 110 also becomes higher, the braking force of the oil damper 150 also becomes higher. As a result, the torque which reduces the tilt angle θ of the main body 12 becomes lower, so that the main body 12 can be prevented from being rapidly moved.

The turn of the rotation shall 110 becomes larger as the tilt angle θ of the main body 12 becomes larger, so that the braking force by the oil damper 150 becomes higher. Therefore, while the tilt angle θ of the main body 12 is small, the braking force by the oil damper 150 is also small, so that assist torque when moving the min body 12 is not excessively suppressed.

Such a rotation mechanism 100 can generate stable assist torque also in a large-screen information processing apparatus in which the size in the diameter direction is desired to be as small as possible but a space is easily secured in the width direction as in the integral-type information terminal 10 according to this embodiment. Moreover, since the diameter of the rotation mechanism 100 can be made small, the height of the entire terminal in the lay flat style as illustrated in FIG. 3 can be made small, which allows operation on the surface near the mount surface S.

The wing shaft of the oil damper 150 can turn in two directions of the normal direction and the reverse direction. However, a bidirectional oil damper which generates a braking force irrespective of the turning direction may be used. The bidirectional oil damper can generate a sufficient braking force in a short time as compared with a unidirectional oil damper which generates a braking force only when turning in either one direction.

For example, when the front surface 12*a* of the main body 12 of the information terminal 10 is placed on the mount surface S, the load applied to the stand 14 disappears. Thus, in the case where the stand 14 is in the unloaded state, when the contact is canceled from the state where the stand 14 and the main body 12 are brought into contact with each other, the stand 14 may rotate at high speed due to the torque generated by the cams 120. At this time, by generating the braking force of the oil damper 150 in a short time, the torque generated by the cams 120 can be suppressed, so that the rotation speed of the stand 14 can be reduced.

[1.3. Conclusion]

As described above, the configuration and the operation of the information terminal 10 according to the first embodiment and the rotation mechanisms 100 for use in the information terminal 10 are described. The information terminal 10 according to this embodiment has the rotation mechanisms 100 each constituted by the compression spring 130, the cams 120 which generate torque using the return force from the natural length of the compression spring 130, and the oil damper 150 which generates the load which reduces the torque generated by the cams 120. By the use of the compression spring 130, the adjustment can be easily performed so that even when the spring constant is made small, a high return force can be generated. Thus, also when the tilt angle $\theta$ of the main body 12 is small, the posture of the information terminal 10 can be stably held and also when the tilt angle $\theta$ of the main body 12 is large, a rapid change of the posture of the information terminal 10 can be avoided.

<2. Second Embodiment>

Next, an information terminal according to a second embodiment of the present disclosure is described. The information terminal according to this embodiment further takes some measures for avoiding a spring back phenomenon which occurs when the information terminal is used in the lay flat style, as compared with the information terminal 10 according to the first embodiment.

In the lay flat style, it is demanded that the front surface 12a of the main body 12 is horizontal to the mount surface S. At this time, a slight reaction force of the compression spring of the rotation mechanisms reduces the use feeling in operating the information terminal 10. The slight swinging caused by the reaction force of the compression spring is referred to as the spring back phenomenon. When the swinging angle of the main body 12 from the state where the front surface 12a of the main body 12 is completely horizontal to the mount surface S is less than 1°, the use feeling is hardly affected. Then, in order to set the swinging angle from the horizontal state of the main body 12 to be less than 1° to avoid the spring back phenomenon, the information terminal according to this embodiment changes the supporting point of the information terminal and adjusts the pressure angle of the cams of the rotation mechanisms.

Figure 9:
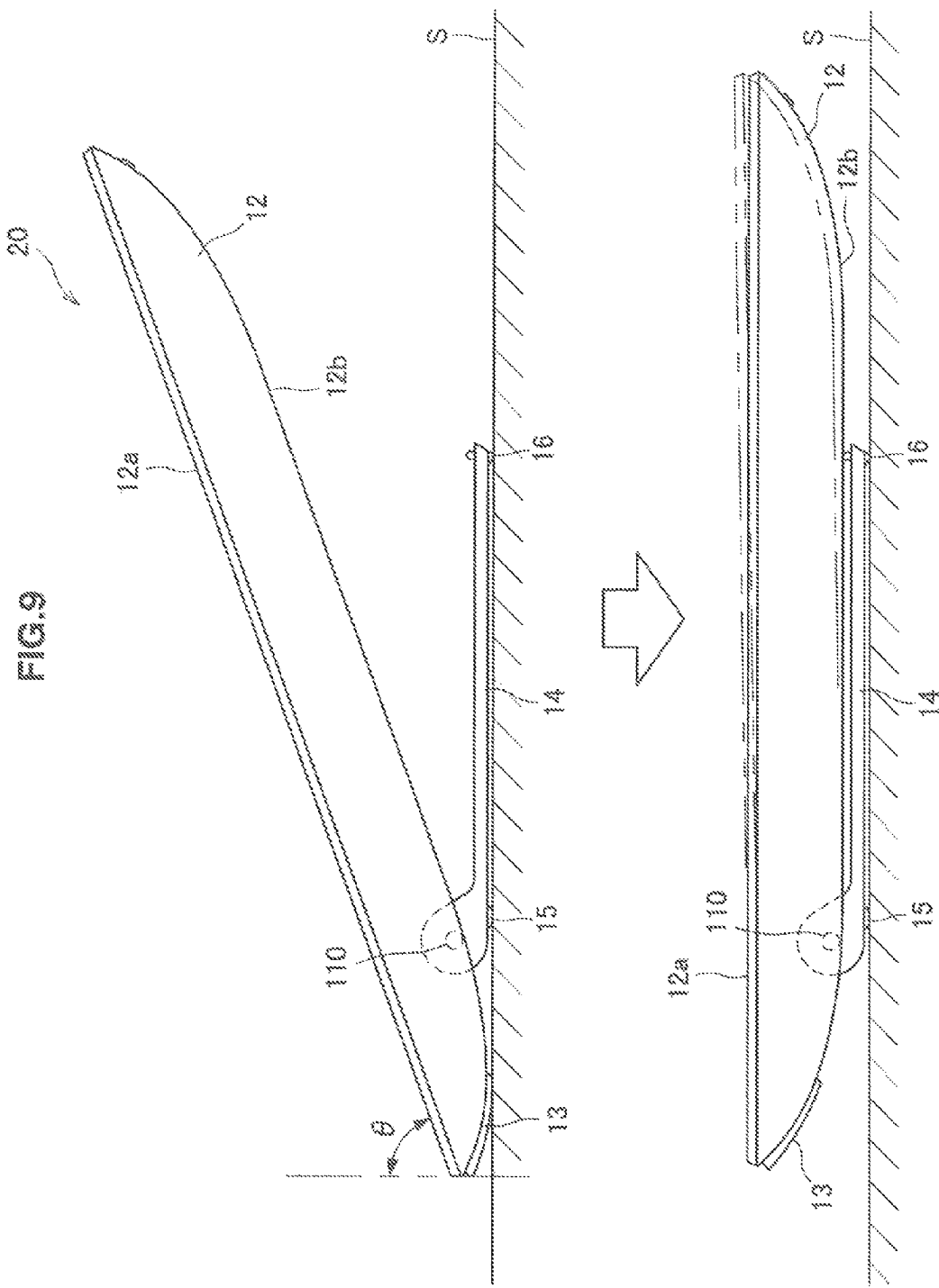
FIG. 9 is a view explaining the change of the supporting point in an information terminal according to a second embodiment of the present disclosure.
Figure 10:
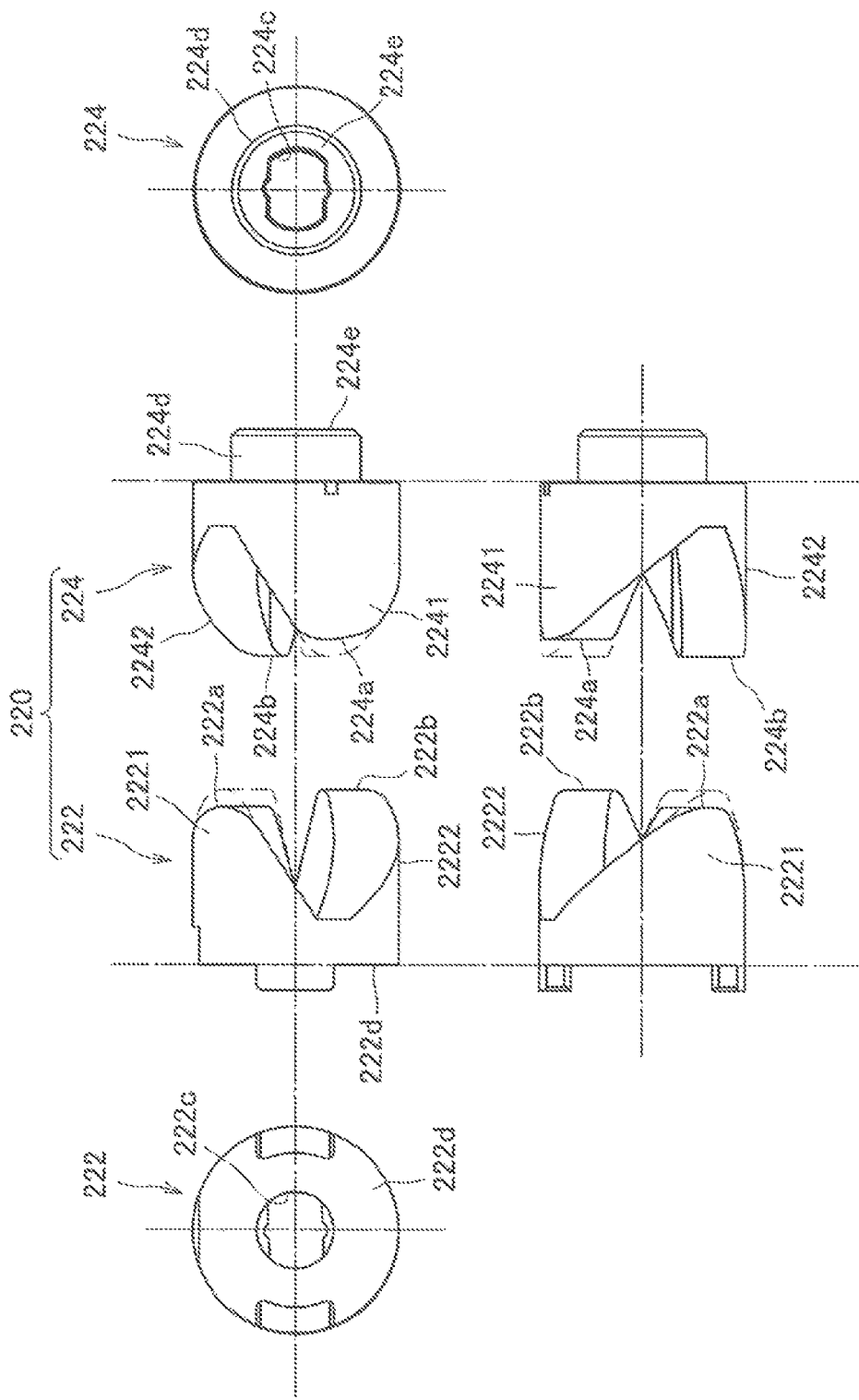
FIG. 10 is a plan view and a side view illustrating the shape of cams of rotation mechanisms according to the embodiment.
Figure 11:
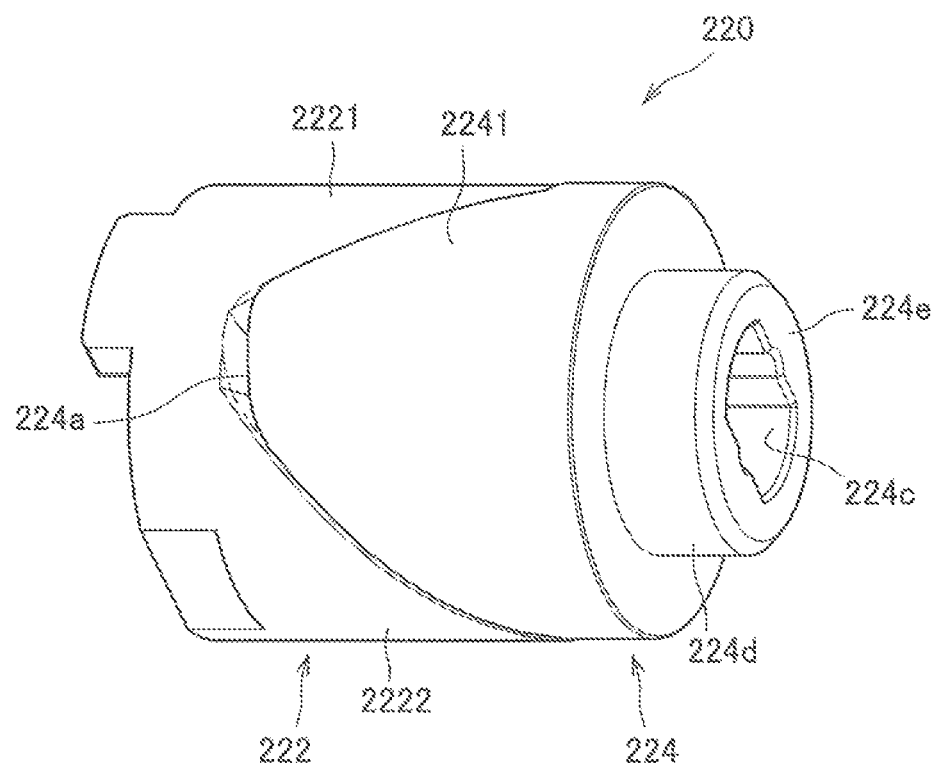
FIG. 11 is a perspective view illustrating the engagement state of the cams according to the embodiment.

Hereinafter, the configuration of an information terminal 20 according to the second embodiment of the present disclosure is described with reference to FIG. 9 to FIG. 12. FIG. 9 is a view explaining the change of the supporting point in the information terminal 20 according to this embodiment. FIG. 10 is a plan view and a side view illustrating the shape of cams 220 of rotation mechanisms 200 according to this embodiment. FIG. 11 is a perspective view illustrating the engagement state of the cams 220 according to this embodiment. FIG. 12 is a graph showing the relationship between the tilt angle $\theta$ of the main body 12 to the perpendicular direction and a torque T generated by the rotation mechanisms 200. Note that the rotation mechanisms 200 according to this embodiment are configured by using the cams 220 shown in FIG. 10 as a substitute of the cams 120 in the rotation mechanisms 100 according to the first embodiment.

[2.1. Change of Supporting Point of Information Terminal]

The information terminal 20 according to this embodiment contains the main body 12 and the stand 14 as illustrated in FIG. 9 similarly to the information terminal 10 according to the first embodiment. As compared with the information terminal 10 according to the first embodiment, the information terminal 20 according to this embodiment is different in that a leg portion 15 and a support portion 16 are provided in portions contacting the mount surface S of the stand 14 when the information terminal 20 is placed on the mount surface S. Since the other configurations are the same as those of the information terminal 10, the same members of the same configurations are designated by the same reference numerals as those of the first embodiment and a detailed description is omitted.

When the tilt angle $\theta$ of the main body 12 of the information terminal 20 becomes larger so that the usage style of the information terminal 20 is close to the lay flat style, the assist torque demanded in the rotation mechanism 200 become higher, so that the friction of the information terminal 20 relatively become smaller. Therefore, a small difference is likely to arise in the balance of the assist torque and the friction of the information terminal 20, and, as a result, when operating the front surface 12a of the main body 12, vibration caused by the compression spring 130 is generated in some cases. Then, when the tilt angle $\theta$ of the main body 12 of the information terminal 20 becomes large, so that the front surface 12a becomes almost horizontal, the information terminal 20 according to this embodiment changes the supporting point of the information terminal 20 from the bottom support portion 13 of the main body 12 to the leg portion 15.

The leg portion 15 is provided near the rotation shaft 110 which is the rotation center of the main body 12 and the stand 14 as illustrated in FIG. 9. Moreover, the support portion 16 whose height is approximately the same as that of the leg portion 15 is provided on the end portion distant from the rotation shaft 110 of the stand 14. The leg portion 15 and the support portion 16 may be formed with the same material as that of the bottom support portion 13 and, for example, may be formed from a material with a large coefficient of friction, such as rubber.

In the information terminal 20, at least the bottom support portion 13 and the support portion 16 contact the mount surface S until the tilt angle $\theta$ of the main body 12 reaches a predetermined angle $\theta$, and then the main body 12 is rotated on the contact portion of the bottom support portion 13 and the mount surface S serving as the supporting point as illustrated in the upper view of FIG. 9. Then, when the tilt angle $\theta$ of the main body 12 is equal to or larger than the predetermined angle $\theta$, the bottom support portion 13 of the main body 12 is separated from the mount surface S, and then the supporting point of the information terminal 20 is changed to the leg portion 15 of the stand 14. At this time, the information terminal 12 is supported by the leg portion 15 and the support portion 16.

Thus, by moving the supporting point of the information terminal 20 to a position near the rotation shaft 110 when the tilt angle of the main body 12 is equal to or larger than the predetermined angle $\theta$, torque demanded for rotating the main body 12 can be reduced. The predetermined angle $\theta$ can be set to, for example, an angle at which a user operates the display surface provided on the front surface 12a of the main body 12 from the upper portion, e.g., about 65° to 85°. The angle $\theta$ is preferably set to about 68° to 72° and more preferably about 70°.

[2.2. Adjustment of Pressure Angle of Cam]

In the information terminal 10 according to this embodiment, the supporting point of the information terminal 20 is moved to a position near the rotation shaft 110 when the tilt angle of the main body 12 is equal to or larger than the predetermined angle θ, whereby torque demanded for rotating the main body 12 is reduced. Thus, the assist torque demanded in the rotation mechanism 200 can also be reduced. Then, when the tilt angle of the main body 12 becomes larger, the rotation mechanism 200 according to this embodiment reduces torque generated by the rotation mechanism 200 to thereby avoid the generation of the spring back phenomenon.

The size of the torque generated by the rotation mechanism 200 is determined by the size of the return force of the compression spring 130 transmitted to the cams 220. The size of the return force of the compression spring 130 transmitted to the cams 220 can be changed by adjusting the pressure angle of the cams 220. The pressure angle of the cams 220 means the angle formed by the normal line of the curved surface of a first cam 222 fixed to the rotation shaft 110 and the movement direction of a second cam 224 which follows along the curved surface of the first cam 222. In the case of the cam which performs swinging movement, the maximum pressure angle is generally set to 45' or less. By reducing the pressure angle of the cam 220, the return force of the compression spring 130 transmitted to the cams 220 can be reduced.

In the cams 220 according to this embodiment, the pressure angle is adjusted so that the return force transmitted from the compression spring 130 becomes small when the main body 12 becomes approximately horizontal to the mount surface S. As illustrated in FIG. 10 and FIG. 11, the shape of a tip portion 222a of a first extremity portion 2221 of the first cam 222 is rounder than the shape of a tip portion 222b of a second extremity portion 2222. More specifically, the curvature of the tip portion 222a of the first extremity portion 2221 is larger than the curvature of the tip portion 222b of the second extremity portion 2222.

Moreover, also in the second cam 224, the shape of a tip portion 224a of a first extremity portion 2241 is rounder than the shape of a tip portion 224b of a second extremity portion 2242 similarly to the first cam 222. More specifically, the curvature of the tip portion 224a of the first extremity portion 2241 is larger than the curvature of the tip portion 224b of the second extremity portion 2242. By forming the first cam 222 and the second cam 224 into such a shape, the torque generated when the tilt angle θ of the main body 12 is close to 90" is reduced.

[2.3. Relationship Between Tilt Angle of Main Body and Torque Generated by Rotation Mechanisms]

By changing the supporting point of the information terminal 20 and adjusting the pressure angle of the cams 220 of the rotation mechanisms 200, the relationship between the tilt angle θ of the main body 12 and the torque T generated by the rotation mechanisms 200 of the information terminal 20 according to this embodiment is as shown in FIG. 12. The dashed lines of FIG. 12 show the relationship between the tilt angle θ of the main body 12 and the torque T at the equilibrium point at which the balance with the frictional force is achieved and the posture of the main body 12 is held.

As shown by the dashed lines of FIG. 12, in the rotation mechanisms 200 according to this embodiment, the torque T which changes similarly to the change of the torque at the equilibrium point with the change of the tilt angle θ is generated until the tilt angle θ of the main body 12 reaches a predetermined angle θ. When the tilt angle θ of the main body 12 reaches the predetermined angle θ, the supporting point of the information terminal 20 is changed from the bottom support portion 13 to the leg portion 15. Thus, the supporting point of the information terminal 20 is close to the rotation shaft 110 of the rotation mechanism 200, and the torque demanded in the rotation mechanisms 200 becomes smaller, and as a result, the torque T at the equilibrium point becomes smaller.

When the tilt angle θ of the main body 12 is increased exceeding the predetermined angle θ at the torque T at the equilibrium point increases again. At this time, the first cam 222 and the second cam 224 are bought into contact with each other at a portion where the curvature of the tip portion is changed in such a manner that the pressure angle becomes small. When the increase ratio of the return force of the compression spring 130 transmitted to the cam 220 become small and the front surface 12a of the main body 12 is almost horizontal, the torque generated by the rotation mechanisms 200 becomes smaller than that in the rotation mechanism 100 of the first embodiment.

Herein, when a difference ΔT between the torque at the equilibrium point and the torque generated by the rotation mechanism 200 is equal to or less than the static friction, the swinging angle when the front surface 12a of the main body 12 is almost horizontal is less than 1', so that the spring back phenomenon does not occur. Therefore, the pressure angle of the cam 220 is adjusted in such a manner that the torque difference ΔT when the front surface 12a of the main body 12 is almost horizontal is equal to or less than the static friction.

[2.4. Conclusion]

As described above, the configuration of the information terminal 20 and the cams 220 of the rotation mechanisms 200 according to this embodiment and the operation thereof are described. Due to the fact that the information terminal 20 has the rotation mechanisms 200 each having the compression spring 130, the cams 220, and the oil damper 150, also when the tilt angle θ of the main body 12 is small, the posture of the information terminal 20 can be stably held and also when the tilt angle θ of the main body 12 is large, a rapid change of the posture of the information terminal 20 can be avoided similarly to the first embodiment.

Moreover, the pressure angle of the cams 220 is set in such a manner that, as the compression spring 130 is further compressed, the change ratio in which the return force is converted to the force which rotates the cams 220 decreases. Thus, since the generation of the reaction force of the compression spring 130 generated when the main body 12 and the stand 14 are almost horizontal can be reduced, the generation of the spring back phenomenon can be prevented and light and comfortable angle adjustment can be realized. At this time, by changing the supporting point of the information terminal 20 according to the tilt angle θ of the main body 12, when the front surface 12a of the main body 12 is almost horizontal, the torque at the equilibrium point can be made small, so that the torque adjustment of the rotation mechanism 200 can be easily performed.

As described above, the preferable embodiments of the present disclosure are described in detail with reference to the appended drawings but the technical scope of the present disclosure is not limited to the examples. It should be understood by those skilled in the art that various modifications, combinations, sub-combinations and alterations may occur depending on design requirements and other factors insofar as they are within the scope of the appended claims or the equivalents thereof.

For example, although the information processing apparatus to which the rotation mechanisms 100 and 200 are applied is the information terminal 10 or 20 in which the main body 12 having a display portion, a substrate, and the like is supported by the stand 14 in the above-described embodiments, the present technique is not limited to this example. For example, the information processing apparatus may be an apparatus configured by rotatably connecting two members, such as a notebook type personal computer, a foldable mobile communication terminal, and a game machine. The rotation mechanisms 100 and 200 according to an embodiment of the present disclosure are applicable even in the case where the weights of the two members rotatably connected as in the above-described information terminals 10 and 20 are considerably different from each other or even in the case where the weights of the two members are almost the same.

In the second embodiment, although the leg portion 15 to which the supporting point is changed from the bottom support portion 13 according to the tilt angle θ of the main body 12 is provided on the stand 14, the present technique is not limited to this example. The leg portion 15 may be provided near the rotation shaft 110 in such a manner as to contact the mount surface S when the tilt angle θ of the main body 12 is equal to or larger than the predetermined angle θ and may be provided on the back surface 12b of the main body 12.

Furthermore, in the above-described embodiments, although the two rotation mechanisms 100 and 200 are provided at the connection portion of the two members in the information terminals 10 and 20, the present technique is not limited to this example. The number of the rotation mechanisms provided in one connection portion of the two members may be one.

Additionally, the present technology may also be configured as below (1) An information processing apparatus including:
  a first member and a second member which are connected by rotation mechanisms,
  wherein the rotation mechanisms each have
    a compression spring which expands and contracts along an axial direction of a rotation shaft serving as a center of a rotation,
    a cam which is rotated by the compression member and generate torque which rotates the first member and the second member, and
    a damper which generates a load to the torque generated by the cam according to a rotation speed of the rotation shaft, and
  wherein a pressure angle of the cam is set in such a manner that a ratio in which a return force of the compression spring is converted to force which rotates the cam as the compression spring is further compressed is reduced.

(2) The information processing apparatus according to (1),
  wherein the pressure angle of the cam is set in such a manner that a ratio in which the return force of the compression spring is converted to the force which rotates the cam is reduced at a position where the first member and the second member are substantially parallel to each other.

(3) The information processing apparatus according to (2),
  wherein the pressure angle of the cam is set in such a manner that a difference between the torque generated by the earn and a frictional force of the rotation mechanisms is equal to or less than static friction at the position where the first member and the second member are substantially parallel to each other.

(4) The information processing apparatus according to any one of (1) to (3),
  wherein the compression spring is provided between the cam and the damper in a state where the compression spring is more compressed than in a state in natural length.

(5) The information processing apparatus according to any one of (1) to (4),
  wherein the damper is a rotary type damper and acts on both directions of a normal direction and a reverse direction in which the rotation shaft rotates.

(6) The information processing apparatus according to any one of (1) to (5),
  wherein a movable range of the second member to the first member is 15" to 90'.

(7) The information processing apparatus according to any one of (1) to (6),
  wherein when the second member is placed on a mount surface, a supporting point of rotation of the information processing apparatus contacting the mount surface is different between when a tilt angle of the first member to the mount surface is smaller than a predetermined tilt angle and when the tilt angle of the first member is equal to or larger than the predetermined tilt angle.

(8) The information processing apparatus according to (7),
  wherein the predetermined tilt angle at which the supporting point of the rotation of the information processing apparatus changes is 65' to 85'.

(9) The information processing apparatus according to any one of (1) to (8),
  wherein in both cases where the first member and the second member are overlapped with each other and where the first member and the second member are separated, the rotation mechanisms operate in a synchronized manner.

(10) The information processing apparatus according to any one of (1) to (9),
  wherein the first member is a main body of the information processing apparatus,
  wherein the second member is a stand which is rotatably provided on a back surface of the main body and supports the main body,
  wherein a first supporting portion serving as a supporting point of a rotation of the main body until a tilt angle of the main body to a mount surface, on which the information processing apparatus is placed, reaches a predetermined tilt angle is provided in a lower portion of the main body contacting the mount surface, and
  wherein a second supporting portion which serves as the supporting point of the rotation of the main body when the tilt angle of the main body is equal to or larger than the predetermined tilt angle is provided on the back surface of the main body or the stand.

What is claimed is:

1. An information processing apparatus comprising:
  a first member and a second member which are connected by a plurality of rotation mechanisms,
  wherein the rotation mechanisms each comprise:
    a compression spring which expands and contracts along an axial direction of a rotation shaft serving as a center of a rotation,
    a cam which is rotated by a compression member and which generates torque which rotates the first member relative to the second member, and
    a damper which generates a load to the torque generated by the cam according to a rotation speed of the rotation shaft, and
  wherein a pressure angle of the cam is set in such a manner that a ratio of converting a return force of the compression spring to a force which rotates the cam is reduced as the compression spring is further contracted.

2. The information processing apparatus according to claim 1,
wherein the pressure angle of the cam is set in such a manner that the ratio in which the return force of the compression spring is converted to the force which rotates the cam is reduced at a position where the first member and the second member are substantially parallel to each other.

3. The information processing apparatus according to claim 2,
wherein the pressure angle of the cam is set in such a manner that a difference between the torque generated by the cam and a frictional force of the rotation mechanisms is equal to or less than static friction at the position where the first member and the second member are substantially parallel to each other.

4. The information processing apparatus according to claim 1,
wherein the compression spring is provided between the cam and the damper in a state where the compression spring is more contracted than in a state of natural length.

5. The information processing apparatus according to claim 1,
wherein the damper is a rotary type damper and acts on both directions of a normal direction and a reverse direction in which the rotation shaft rotates.

6. The information processing apparatus according to claim 1, wherein a movable range of the second member to the first member is 15° to 90°.

7. The information processing apparatus according to claim 1,
wherein when the second member is placed on a mount surface, a supporting point of rotation of the information processing apparatus contacting the mount surface is different between when a tilt angle of the first member to the mount surface is smaller than a predetermined tilt angle and when the tilt angle of the first member to the mount surface is equal to or larger than the predetermined tilt angle.

8. The information processing apparatus according to claim 7,
wherein the predetermined tilt angle at which the supporting point of the rotation of the information processing apparatus changes is between 65° to 85°.

9. The information processing apparatus according to claim 1,
wherein in both cases where the first member and the second member are overlapped with each other and where the first member and the second member are separated, the rotation mechanisms operate in a synchronized manner.

10. The information processing apparatus according to claim 1,
wherein the first member is a main body of the information processing apparatus,
wherein the second member is a stand which is rotatably provided on a back surface of the main body and which supports the main body,
wherein a first supporting portion, which serves as a supporting point of a rotation of the main body until a tilt angle of the main body to a mount surface, on which the information processing apparatus is placed, reaches a predetermined tilt angle, is provided in a lower portion of the main body contacting the mount surface, and
wherein a second supporting portion, which serves as the supporting point of the rotation of the main body when the tilt angle of the main body is equal to or larger than the predetermined tilt angle, is provided on the back surface of the main body or the stand.

* * * * *